US006827157B2

(12) United States Patent
Fuchs

(10) Patent No.: US 6,827,157 B2
(45) Date of Patent: Dec. 7, 2004

(54) HAND POWER TOOL WITH HOUSING HAVING AIR INLET AND AIR OUTLET OPENINGS

(75) Inventor: Rudolf Fuchs, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 103 days.

(21) Appl. No.: 10/216,533

(22) Filed: Aug. 9, 2002

(65) Prior Publication Data

US 2003/0094293 A1 May 22, 2003

(30) Foreign Application Priority Data

Nov. 16, 2001 (DE) ........................................ 101 56 387

(51) Int. Cl.[7] ............................ E21B 17/22; H02K 7/14
(52) U.S. Cl. .......................... 173/217; 173/171; 310/47
(58) Field of Search ................................ 173/171, 217; 227/156; 310/47, 50

(56) References Cited

U.S. PATENT DOCUMENTS 2,320,340 A * 6/1943 Appton ........................ 60/695
2,456,571 A * 12/1948 Turner et al. ................. 310/50
5,317,224 A * 5/1994 Ragaly ........................ 310/58
5,419,737 A * 5/1995 Brazell et al. .............. 451/453
5,526,777 A 6/1996 Taomo et al.
5,911,281 A 6/1999 Treskog et al.
6,043,575 A 3/2000 Ghode et al.
6,543,549 B1 * 4/2003 Riedl et al. ................. 173/216

FOREIGN PATENT DOCUMENTS

DE 196 26 245 A1 1/1998
JP 2000-6055 1/2000

* cited by examiner

*Primary Examiner*—Scott A. Smith
*Assistant Examiner*—Brian D Nash
(74) *Attorney, Agent, or Firm*—Michael J. Striker

(57) ABSTRACT

A hand power tool has a housing provided with air inlet and/or air outlet openings, the openings are arranged in various regions of the housing and have different directions, and a cover is movably supported on the housing so as to close a part of the openings.

4 Claims, 1 Drawing Sheet

HAND POWER TOOL WITH HOUSING HAVING AIR INLET AND AIR OUTLET OPENINGS

BACKGROUND OF THE INVENTION

The present invention relates to a hand power tool which has a housing with air inlet and air outlet openings.

More particularly, it relates to such hand power tool in which the openings are arranged in different regions of the housing, so that they have different directions.

In electrically operated hand power tools, for example in screwing tools, drills, drill or impact hammers, saws, grinders, etc., fans as a rule are arranged for cooling the motor and the transmission by aspirating cold air through the openings in the housing or blowing hot air outside. As disclosed for example in the German patent document DE 196 26 245 A1, the air inlet or the air outlet openings are distributed around the housing of the hand power tool, so that the openings have different directions. This means that during the operation of the hand power tool in each point of time air is aspirated or blown out around the housing through all openings, or in other words from all directions or to all directions.

In individual applications of the hand power tools, it can however be disadvantageous when air is aspirated or blown from several sides into the housing or out of the housing. The reason is that it is uncomfortable when the operator of the hand power tool is subjected to hot air in the sight of view or on his body. It is therefore desirable that, depending on whether the operator is left handed or right handed, air be not blown to the direction associated with the operator. It is also disadvantageous when air is aspirated into or blown from the housing in the vicinity of dust or chips to produce a flow with dust or chips, which can be extremely detrimental to the operator.

SUMMARY OF THE INVENTION

Accordingly, it is an object of the present invention to provide a hand power tool in which air inlet openings and air outlet openings of the housing are oriented so that the air aspirated or blown out during the operation of the power tool does not act in disturbing manner.

In keeping with these objects and with others which will become apparent hereinafter, one feature of the present invention resides, briefly stated, in a hand power tool in which on the housing a movable cover is provided, for closing a part of the openings facing in various directions.

When the hand power tool is designed in accordance with the present invention, then with simple means the direction of the air inlet and air outlet openings can be changed so that the aspirated or blown air is not disturbing during the operation of the hand power tool.

In accordance with another advantageous feature of the present invention the openings on the housing are arranged so as to have a ring-shaped circumferential track, and the cover is formed as a strip of an elastic material which is displaceably supported on the track and surrounds the ring-shaped track only partially.

In accordance with still a further feature of the present invention, it is advantageous when the strip which forms the cover is guided with its edges in grooves, which are formed in the housing at both sides of the ring-shaped track.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
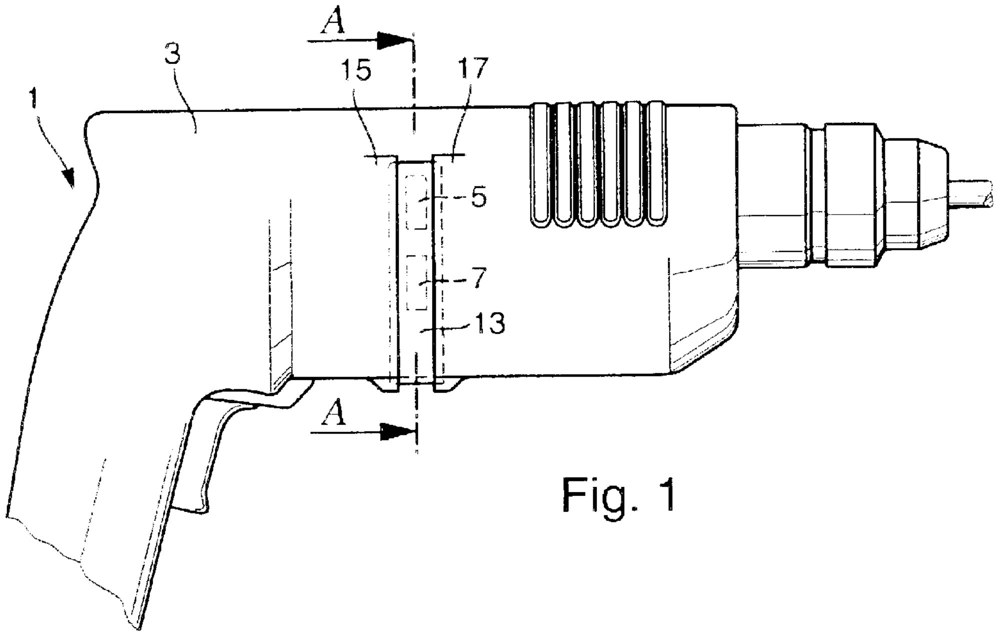
FIG. 1 is a side view of an electrical power tool with a cover which is supported displaceably on the housing of the tool.

A hand power tool in accordance with the present invention is formed as a hammer drill and identified as a whole with reference numeral 1. It is shown on a side view in FIG. 1.

A plurality of air inlet and air outlet openings are provided in the housing 3 and distributed over its periphery. In the side view of FIG. 1, for example two openings 5 and 7 are shown. FIG. 2 shows a cross-section A—A through the housing 3 of the hand power tool. It can be seen that on the opposite side of the housing 3 two further openings 9 and 11 are provided.

The present invention is not limited to a predetermined number and the shape of the openings 5, 7, 9, 11. Also, for the position of the openings 5, 7, 9, 11 in the housing 3, there can be many variations. The openings however must be placed so that air can be aspirated into the housing or blown out of the housing through the openings in directions which differ from one another as much as possible.

A cover 13 is supported on the housing 3 movably, for example displaceably relative to the housing. The housing 13 is formed and arranged so that a selectable part of the openings 5, 7, 9, 11 can be closed. The cover 13 is displaced over corresponding openings 5, 7, 9, 11, which are not desired for providing air inflow or air outflow during the operation of the hand power tool 1. The cover 13 must be formed so that not all openings 5, 7, 9, 11 are simultaneously closeable by it, but instead at least one of the available openings remains open.

For the practical construction of the cover 13, it is especially advantageous when the openings 5, 7, 9, 11 are arranged so that they are distributed over a track which surrounds the housing 3 in a ring-shaped manner. The cover 14 can be formed as a strip which is supported over this track and surrounds the ring-shaped track only partially. FIG. 2 which is a cross-section A—A through the housing 3 in the region of the cover 13, shows that the cover 13 surrounds the housing 3 partially.

Advantageously, the cover 13 is composed of an elastic material, for example a metal sheet. The cover 13 can be adapted to the shape of the housing, which as a rule is not round. Therefore, a tight closure of the openings 5, 7, 9, 11 is provided. The strip-shaped cover 13 is guided with its both longitudinal edges in grooves 15 and 17. The grooves are formed in the housing 13 at both sides of the ring-shaped track of the housing 3 provided with the openings 5, 7, 9, 11.

Figure 2:
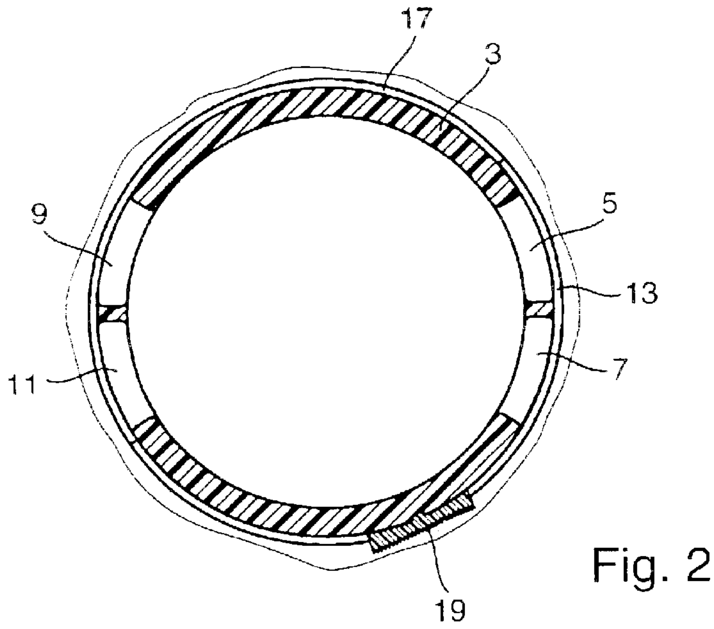
FIG. 2 is a cross-section A—A through the housing in the region of the displaceably supported cover.

The covers 19 shown In FIGS. 1 and 2 is guided on the outer side of the housing 3. However, it can be guided also on the inner side of the housing.

As shown in FIG. 2, it is advisable to provide a gripping trough 19 with knurling in order to facilitate the displacement of the cover.

In deviation from the above shown embodiment, also the movable cover can be formed as flippable or rotatable cover, which closes a part of the openings.

It will be understood that each of the elements described above, or two or more together, may also find a useful application in other types of constructions differing from the types described above.

While the invention has been illustrated and described as embodied in hand power tool with housing having air inlet and air outlet openings, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A hand power tool, comprising a housing provided with a plurality of openings, wherein said openings comprise air inlet openings or air outlet openings or both air inlet and air outlet openings, said openings being arranged in various regions of said housing and having different orientations for directing an air flow in different directions, and a cover which is movably supported on said housing so as to close a part of said openings, wherein said openness are distributed on said housing over a ring-shaped track, said cover being formed as a strip which is displaceably supported over said ring-shaped track and partially covers said ring-shaped track.

2. A hand power tool as defined in claim 1, wherein said strip which forms said cover is composed of an elastic material.

3. A hand power tool as defined in claim 1; and further comprising means for guiding said strip which form said cover, during movement of said strip.

4. A hand power tool as defined in claim 3, wherein said guiding means include grooves provided in said housing at both sides of said ring-shaped track, said strip having edges which are guided in said grooves.

* * * * *